US 6,615,356 B1

(12) United States Patent
Byun (10) Patent No.: US 6,615,356 B1
(45) Date of Patent: Sep. 2, 2003

(54) SYSTEM AND METHOD FOR CONTROLLING A SYSTEM POWER SUPPLY USING A PASSWORD (75) Inventor: Jung-gun Byun, Suwon (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 0 days.

(21) Appl. No.: 09/281,803

(22) Filed: Mar. 31, 1999

(30) Foreign Application Priority Data

Apr. 28, 1998 (KR) .............................. 98-15119

(51) Int. Cl.⁷ .............................................. H04L 9/00
(52) U.S. Cl. ..................... 713/200; 713/300; 710/100
(58) Field of Search ................................ 713/300, 310, 713/320, 330, 340, 324; 710/100

(56) References Cited

U.S. PATENT DOCUMENTS

| 4,959,860 | A | | 9/1990 | Watters et al. | |
|---|---|---|---|---|---|
| 5,198,806 | A | | 3/1993 | Lord | |
| 5,313,639 | A | | 5/1994 | Chao | |
| 5,446,906 | A | | 8/1995 | Kardach et al. | |
| 5,483,464 | A | * | 1/1996 | Song | 364/492 |
| 5,485,622 | A | | 1/1996 | Yamaki | |
| 5,532,524 | A | * | 7/1996 | Townsley et al. | 307/46 |
| 5,652,892 | A | * | 7/1997 | Ugajin | 395/750 |
| 5,708,819 | A | * | 1/1998 | Dunnihoo | 395/750 |
| 5,751,950 | A | * | 5/1998 | Crisan | 395/188.01 |
| 5,754,868 | A | * | 5/1998 | Yamamoto et al. | 395/750.01 |
| 5,812,821 | A | * | 9/1998 | Sugi et al. | 395/500 |
| 5,828,831 | A | | 10/1998 | Kong | |
| 5,845,136 | A | | 12/1998 | Babcock | |
| 5,872,515 | A | | 2/1999 | Ha et al. | |
| 5,909,584 | A | * | 6/1999 | Tavallaei et al. | 395/750.01 |
| 5,960,084 | A | * | 9/1999 | Angelo | 380/25 |
| 5,978,919 | A | * | 11/1999 | Doi et al. | 713/202 |
| 6,041,413 | A | * | 3/2000 | Wang | 713/202 |
| 6,160,873 | A | * | 12/2000 | Truong et al. | 379/102.02 |
| 6,202,161 | B1 | * | 3/2001 | Wang | 713/310 |
| 6,237,100 | B1 | * | 5/2001 | Cromer et al. | 713/300 |
| 6,298,447 | B1 | * | 10/2001 | Wang | 713/202 |

OTHER PUBLICATIONS

Microsoft Corporation: Microsoft Computer Dictionary, 5th Edition. Microsoft Press, Washington, 2002, see p. 305.*

* cited by examiner

Primary Examiner—Gail Hayes
Assistant Examiner—Leynna Ha
(74) Attorney, Agent, or Firm—Robert E. Bushnell, Esq.

(57) ABSTRACT

In a system such as a computer system, and in a power controlling method for the system, power applied to the overall system is controlled according to correctness or incorrectness of a password in starting up the system. The password is received from a user. Power is applied to the overall system only when the input password is identical to a preset password, and the power is shut off if not. If the password is correct, the applied power is automatically shut off, thereby prohibiting unauthorized use of the system. In starting up the system, only the minimum power necessary for inputting the password and controlling the power is applied to the system, thereby advantageously preventing unnecessary power consumption.

33 Claims, 5 Drawing Sheets

SYSTEM AND METHOD FOR CONTROLLING A SYSTEM POWER SUPPLY USING A PASSWORD

CLAIM OF PRIORITY

This application makes reference to, incorporates the same herein, and claims all benefits accruing under 35 U.S.C. §119 from an application for SYSTEM AND METHOD FOR CONTROLLING POWER SUPPLY USING PASSWORD earlier filed in the Korean Industrial Property Office on the 28$^{th}$ of April 1998 and there duly assigned Serial No. 15119/1998.

BACKGROUND OF THE INVENTION

1. Field of the Invention

The present invention relates to a system such as a computer and a power controlling method in starting up the system and, more particularly, to a system for controlling power applied to the overall system according to correctness or incorrectness of a password in starting up the system, and a power controlling method therefor.

2. Description of the Related Art

A system exemplary of contemporary practice in the art in which the use of the system is controlled by a password includes a start-up switch for applying external power to a power supply, the power supply converting the external power input through the startup switch into the power suitable for the computer system and supplying the converted power, a key board for receiving a password, and computer components, such as a processor or central processing unit (CPU) and a memory, for example.

In such a system exemplary of contemporary practice in the art, the computer is either permitted for use or restricted from use by determining whether or not the input password is identical to a preset password. If the startup switch is turned on, power is applied to the overall system. Then, the password is input and compared with the preset password by a pre-programmed BIOS (Basic Input Output System) or a system program. If the passwords are identical to each other, a predetermined operation, such as booting, is executed. If not, the system is halted, and thus the system cannot be further used.

However, in the system and method exemplary of contemporary practice in the art, if the startup switch is turned on, the power is applied to the overall system. Thus, even a person who does not know the password can try to use the system several times. Even when the use of the computer is prohibited due to an incorrect password, the power is not shut off but the system is only halted, which can cause useless power consumption.

Particularly, in a system in which power saving is required, such as a portable computer using a battery, irrespective of whether external power is connected or not, when the startup switch is turned on, the power is applied to the overall system. Thus, the available time or life of the battery can be easily shortened by unauthorized attempts to use the system.

U.S. Pat. No. 4,959,860 to Watters et al., entitled POWER-ON PASSWORD FUNCTIONS FOR COMPUTER SYSTEM, discloses a power-on password security function for a digital computer system which allows the system software to distinguish between authorized and unauthorized users. It is disclosed that safeguards are made against corruption of password data which could lead to lock-out of authorized users, and redundant checks allow the security function to operate even when first-level checks fail. The battery-powered RAM storage area used to hold the password when the system is turned "off" is protected against being accessible by unauthorized users when the system is turned "on".

U.S. Pat. No. 5,198,806 to Lord, entitled REMOTE CONTROL AND SECURE ACCESS FOR PERSONAL COMPUTERS, discloses a computer activation device which is comprised of at least one local computer system and at least one remote computer system, and the computer systems are connected via a standard data communication interface by their own modems. An activator device is disclosed to be in electrical communication with the data communication interfaces of the local and remote computer systems, such that the activator device controls the application of operative power to the local computer system on receipt and recognition of a secure coded signal from the data communication interface of the remote computer system.

U.S. Pat. No. 5,313,639 to Chao, entitled COMPUTER WITH SECURITY DEVICE FOR CONTROLLING ACCESS THERETO, discloses a computer having a floppy disk drive provided in one of the spaces for receiving disk drives of the computer, a computer keyboard and a main system board. An access control device is disclosed to include a casing placed into another one of the spaces for receiving disk drives of the computer, a keypad provided on a front panel of the casing and operated so as to provide an input password, and a control unit provided within the casing and electrically connected to the keypad. The control unit is disclosed to include a memory unit which contains a desired password, a microprocessor unit which receives the input password from the keypad and which generates an activating signal when the input password tallies with the desired password in the memory unit, and at least one control circuit connected to a respective one of the computer keyboard, the floppy disk drive and the main system board. It is disclosed that each of the control circuits is actuated by the activating signal from the microprocessor unit so as to unlock and enable the respective one of the computer keyboard, the floppy disk drive and the main system board and permit normal operation of the computer.

U.S. Pat. No. 5,446,906 to Kardach et al., entitled METHOD AND APPARATUS FOR SUSPENDING AND RESUMING A KEYBOARD CONTROLLER, discloses a method and mechanism for suspending and resuming a keyboard controller, including a method and mechanism for saving the state of an input device, such as a keyboard and/or mouse, such that the power to those devices can be removed. It is disclosed that the keyboard controller is capable of performing a password security function, and the keyboard controller can be suspended and resumed without jeopardizing the password security function.

U.S. Pat. No. 5,485,622 to Yamaki, entitled PASSWORD PROCESSING SYSTEM FOR COMPUTER, discloses a CPU which determines whether a password canceller is connected to a system main body prior to execution of password check processing on the basis of stored password information at the start of the system. When the password canceller is connected to the system main body, the CPU is disclosed to clear the stored password information to start the system. When the password canceller is not connected to system main body however, the CPU is disclosed to execute password check processing and controls the start of the system.

U.S. Pat. No. 5,828,831 to Kong, entitled SYSTEM FOR PREVENTING UNAUTHORIZED USE OF A PER- SONAL COMPUTER AND A METHOD THEREFORE SECURITY FUNCTION, AND METHODS OF INSTALLING AN DETACHING A SECURITY DEVICE TO/FROM A COMPUTER, discloses a personal computer having a security function, a security method therefor, and methods of installing and detaching a security device. The personal computer is disclosed to include: an input/output and memory portion for inputting, outputting and storing a password; a hard disk for storing the password and a boot sector without partition, which is booted in response to a booting permission signal; a security program storing portion for storing the password and for generating the booting permission signal in response to an initializing signal according to whether the password is valid and whether the hard disk is the hard disk initially installed in the system, and having a boot sector program with partition, and a boot sector protection program for protecting the boot sector of the hard disk; a security portion for processing the boot sector protection program and for performing both read and write operations, the security portion including the security program storing portion; and a central controller for controlling the hard disk, the input/output and memory portion, and the security portion, and for generating the initializing signal when power is turned on, wherein the hard disk is booted in response to whether the security portion exists and whether the security portion is the initially installed security portion. It is disclosed that a booting control security function can be therefore provided using the boot sector of the hard disk and a security function of the boot sector of the hard disk and data can also be provided.

U.S. Pat. No. 5,845,136 to Babcock, entitled CONTROL OF A FUNCTION OF A COMPUTER OTHER THAN A POWER SUPPLY FUNCTION USING A SYSTEM POWER SWITCH, discloses a function of a computer other than a power supply function of the computer which can also be controlled using a power control input of the computer. In response to a pressing of a power button or a closing of a power switch, it is disclosed that a signal is provided which indicates that a function of the computer other than a power supply function of the computer can be performed. This can be implemented, for example, in response to the pressing of the power button or closing of the power switch for a time period longer than a predetermined time period. It is disclosed that in response to a first condition at the power control input (for example, a momentary closing of the power switch or pressing of the power button), power is supplied to the computer, and in response to a second condition at the power control input (for example, the closing of the power switch or pressing of the power button for a time period longer than a predetermined time period), a signal is provided indicating that a non-power supply function of the computer should be performed. For example, a basic input/output system (BIOS) program running on the computer is disclosed to perform an entering of a setup mode of the computer, a clearing, setting or a changing of the password, or a clearing of the system image of the computer in response to the pressing of the power button or closing of the power switch for a time period which is longer than a predetermined time period. It is disclosed that such an implementation does not require a user to open a system chassis of the computer and disconnect any configuration jumpers on the motherboard of the computer.

U.S. Pat. No. 5,872,515 to Ha et al., entitled LAPTOP COMPUTER WITH AN ANTI-THEFT ALARM FUNCTION AND A METHOD OF CONTROLLING THE SAME, discloses a laptop computer with an alarm function using an LCD on/off switch which includes: a microcomputer both for controlling the LCD back-light section on/off operation in response to the on/off state of an LCD on/off switch and for generating an interrupt signal; an alarm processor for determining whether or not the interrupt signal is a burgular alarm signal, and for outputting an alarm in case of a robbery; and a password determining section for comparing a password entered by a user with a previously set password, and for interrupting the generation of an alarm only when both passwords are identical. It is disclosed that a burglar alarm is sounded when an interrupt occurs so as to indicate a robbery as the LCD on/off switch is turned on against a user's will during the operation of the computer. It is also disclosed that it can interrupt the alarm by a user inputting a correct password during the generation of the alarm.

SUMMARY OF THE INVENTION

To solve the above problems, an objective of the present invention is to provide a system having a function of controlling the power applied to the overall system according to correctness or incorrectness of a password.

It is another objective of the present invention to provide a method for controlling the power applied to the overall system according to correctness or incorrectness of a password.

It is still another objective of the present invention to provide a power controlling method by a password, by which power consumption of a battery can be reduced in starting up a portable computer.

Accordingly, there is provided a system including a password input means for receiving a password from a user, a power controller for comparing the input password with a preset password, for outputting a power apply signal if the input password and the preset password are identical or match, and outputting a power shutoff signal if not, and a power supply for applying the power to the system when receiving the power apply signal from the power controller, and shutting off the power to the system when receiving the power shutoff signal from the power controller.

Also, according to the present invention, the system further includes an auxiliary power supply for supplying power only to the password input means and the power controller, wherein the power necessary for inputting a password and controlling the power is supplied from the auxiliary power supply in starting up the system. The auxiliary power supply receives the power shutoff signal from the power controller to shut off the power supplied to the password input means and the power controller.

Moreover, there is provided a method for controlling power in starting up a system including the steps of applying only power necessary for inputting a password and controlling the power if a startup switch of the system is turned on, receiving a password from a user, comparing the input password with a preset pasword, and applying power to the overall system if the input and preset passwords are identical to or match each other, and starting up the system if the input and preset passwords are identical or match.

Further, there is provided a method for controlling power in starting up a portable computer operated by at least one of a battery and an external power supply, including the steps of: applying only power necessary for inputting a password and controlling power if a startup switch is turned on by a user; applying power to the overall portable computer if the external power supply is connected to the portable computer; receiving an input password from the user; comparing the input password with a preset password;

determining whether the input and prestored passwords are identical to or match each other; executing a predetermined operation if the input and prestored passwords are identical or match and if power is being applied to the overall portable computer; applying the power from the battery to the overall portable computer to start up the portable computer if the input and prestored password are identical or match; and shutting off all the applied power to the portable computer if the input and prestored passwords are not identical or do not match.

Also, according to the present invention, the number of times of trial for inputting an input password different from the preset password is counted, and the aforementioned steps of receiving an input password, and comparing the input password with the preset password, are performed if the number of a trial is less than a predetermined number of times. Otherwise, if the input and prestored password are not identical or do not match, and if the number of a trial is equal to the predetermined number of times, the power applied for inputting the password is shut off and the power is controlled, or alternatively all the applied power is shut off the system, such as a portable computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Now, various embodiments of the present invention will be described in detail with reference to the accompanying drawings.

Figure 1:
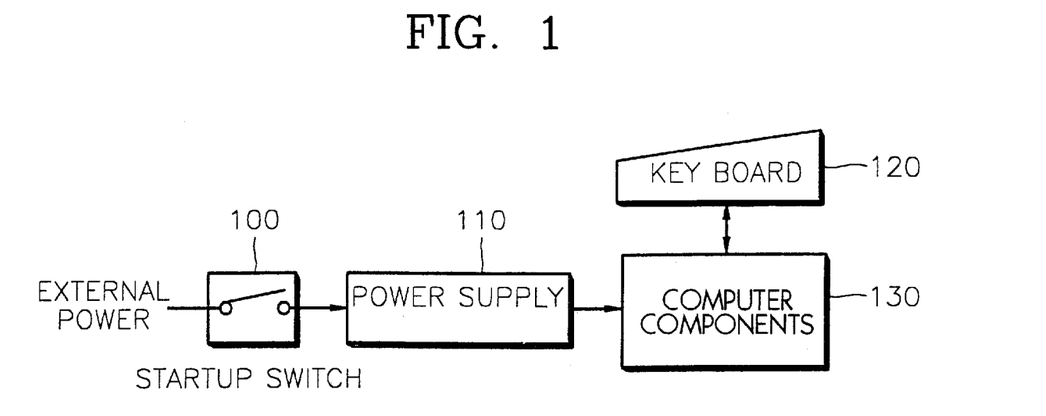
FIG. 1 is a block diagram illustrating a computer system which is controlled by a password exemplary of contemporary practice in the art.

A system exemplary of contemporary practice in the art in which the use of the system is controlled by a password, as shown in FIG. 1, includes a start-up switch 100 for applying external power to a power supply 110, the power supply 110 for converting external power input through the startup switch 100 into power suitable for the computer system and supplying the converted power, a keyboard 120 for receiving a password, and various computer components 130, such as a processor, central processing unit (CPU) and a memory, for example.

In such a system exemplary of contemporary practice in the art, the computer is either permitted for use or restricted from use by determining whether or not the input password is identical to a preset password. If the startup switch is turned on, power is applied to overall system. Then, the password is input and compared with the preset password by a pre-programmed BIOS (basic input output system) or a system program. If the passwords are identical to each other, a predetermined operation, such as booting, is executed. If not, the system is halted, and thus the system cannot be further used.

However, in the system exemplary of contemporary practice in the art of FIG. 1 and method therefor, if the startup switch 100 is turned on, the power is applied to the overall system. Thus, even a person who does not know the password can try to use the system several times. Even when the user of the computer is prohibited due to an incorrect password, the power is not shut off but the system is only halted, which can cause useless power consumption.

Figure 2:
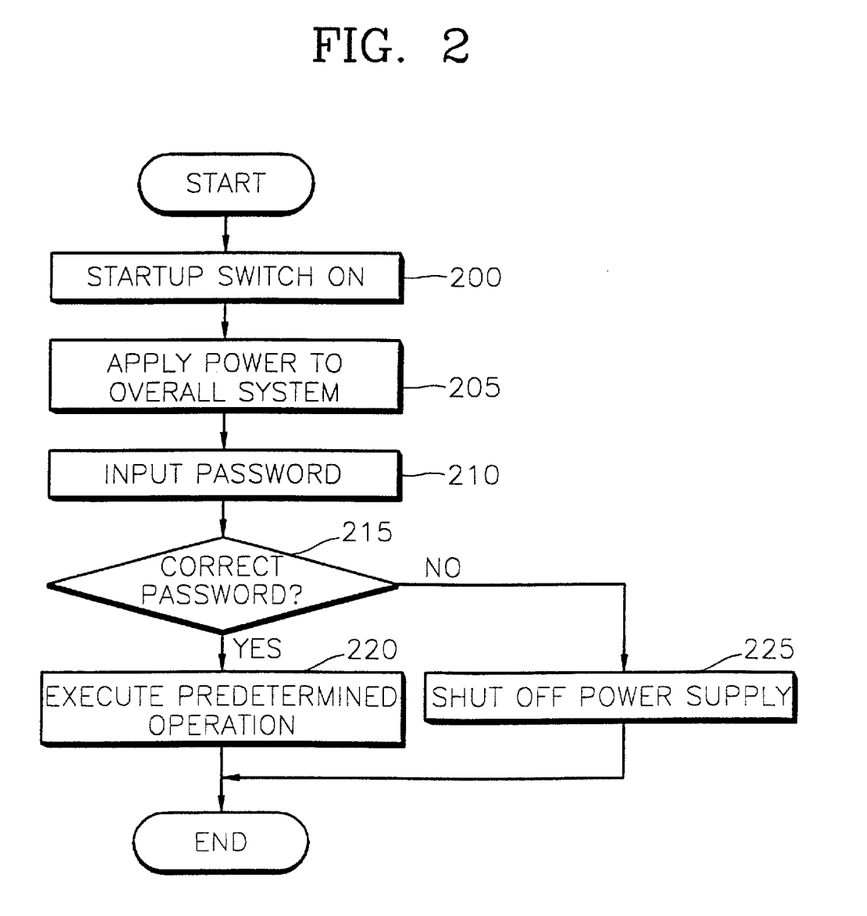
FIG. 2 is a flow chart illustrating a method for controlling power in starting up a system, such as a computer system, according to an embodiment of the present invention.

FIG. 2 is a flow chart illustrating a method for controlling power in starting up the system, such as a computer system, according to an embodiment of the present invention. As shown in FIG. 2, when a startup switch is turned on to use a system such as a computer (step 200), the power is applied to the overall system (step 205), a password is input from a user through an input unit for receiving the password (step 210), and it is determined whether the input password is identical with a predetermined password, such as a preset password or a password previously stored in a memory of the system (step 215). Then, if the input and predetermined passwords are identical, a predetermined operation, e.g., booting, is executed (step 220). If not, the applied power is automatically shut off (step 225). In other words, unlike the power controlling method exemplary of contemporary practice in the art in which the system is just halted if the passwords are not identical to each other, in the power controlling method according to the present invention, the power is automatically shut off to save power, and the use of the system by an unauthorized user can be prohibited.

The power shutoff for the system can be accomplished by turning the startup switch off by a predetermined control signal to have external power not supplied to the system, such as a computer system.

Figure 3:
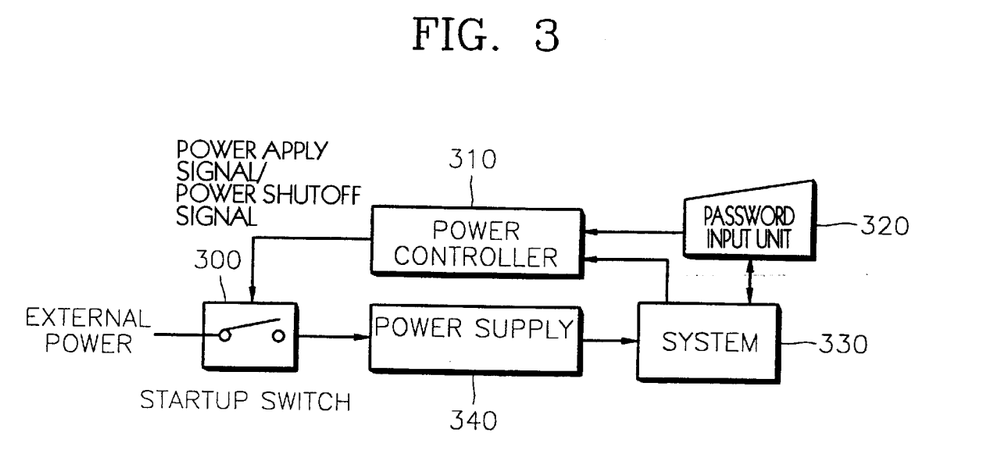
FIG. 3 is a block diagram illustrating a system, such as a computer system, whose power is controlled by a password according to an embodiment of the present invention.

FIG. 3 is a block diagram illustrating a system, such as a computer system, whose power is controlled by a password according to an embodiment of the present invention. The system of FIG. 3 includes a startup switch 300, a power controller 310, a password input unit 320, a system 330 such as a computer system, including a processor or central processing unit (CPU) and a memory, for example, and a power supply 340. The startup switch 300 for applying or shutting off external power to the system is automatically opened by a power shutoff signal generated at the power controller 310. The password input unit 320, e.g., a keyboard, receives a password, such as from a user, during the start-up of the system, and receives data necessary for the system during the operation of the system. The power controller 310 compares the password input through the password input unit 320 with a predetermined password, such as a preset password from a memory of system 330 or a preset password stored in a memory portion of power controller 310, for example, and generates the power shutoff signal if the input and predetermined passwords are not identical to each other. When the startup switch 300 is closed, the power supply 340 receives the external power, converts the external power into power suitable for the system, and supplies such suitable power to the system 330, such as a computer system, having a processor or central processing unit (CPU) and a memory, for example.

Figure 4:
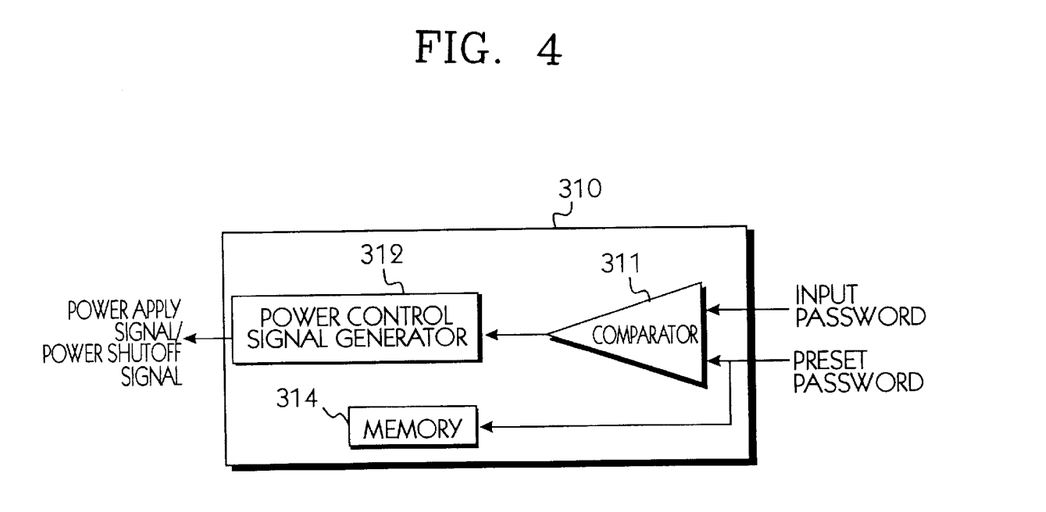
FIG. 4 is a detailed block diagram of a power controller shown in FIG. 3.

As shown in FIG. 4, the power controller 310 can include a comparator 311 for receiving an input password and a preset password, and determining whether the two passwords are identical to each other, and a power control signal generator 312 for receiving the output of the comparator 311 and outputting a power shutoff signal when the two passwords are not identical to each other; the power controller 310 can also be a processor or microprocessor, for example. Although the power controller 310 which receives the preset password from a memory of a system 330 is shown in FIG. 3, a memory portion 314 in which the preset password is stored can also be implemented within the power controller 310.

Figure 5:
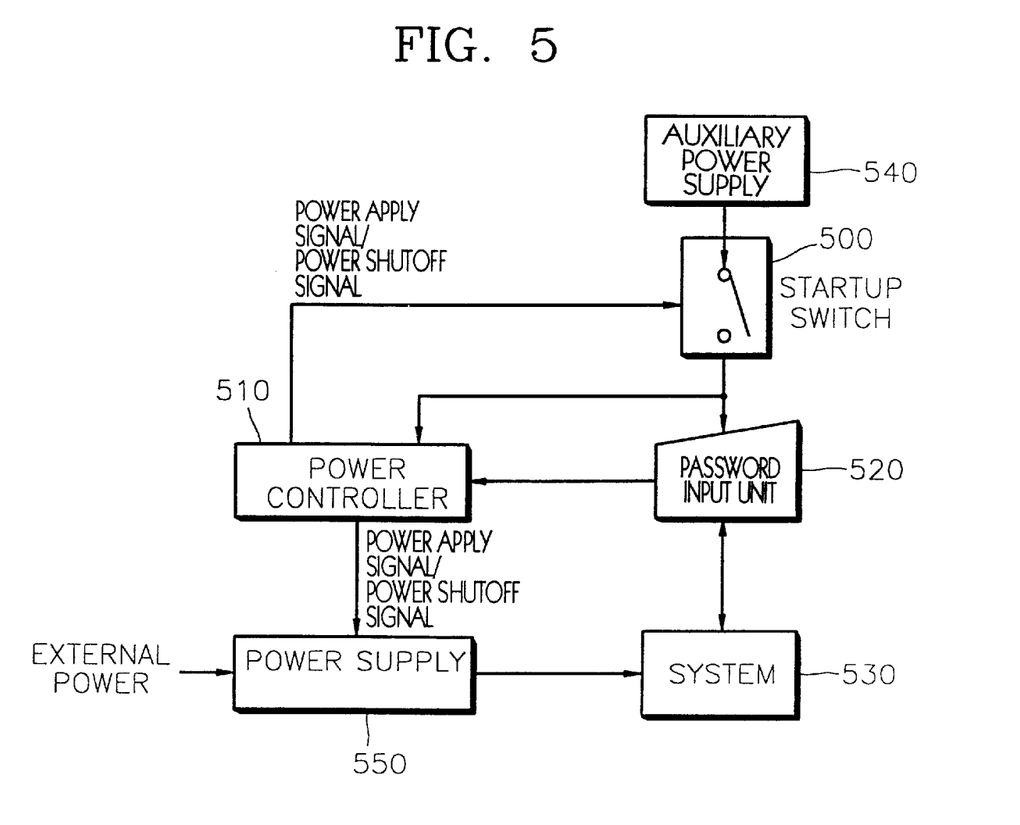
FIG. 5 is a block diagram illustrating a system, such as a computer system, whose power is controlled by a password according to another embodiment of the present invention.

FIG. 5 is a block diagram illustrating a system, such as a computer system, whose power is controlled by a password according to another embodiment of the present invention. Referring to FIG. 5, an auxiliary power supply 540 supplies power only to a power controller 510 and a password input unit 520, such as a keyboard, when a system 530, such as a computer system including a processor or central processing unit (CPU) and a memory, for example, is started up. Thereafter, the password is input and the power control corresponding thereto is executed by power controller 510. Generally, the auxiliary power supply 540 can be a battery charged by external power during a normal operation or a battery by which power is supplied only to an independent chip as a power controller programmed to execute a power control function according to the present invention.

Continuing with reference to FIG. 5, the power controller 510 receives the power from the auxiliary power supply 540, compares the password input through the input means or password input unit 520 with a predetermined password, such as a preset password from a memory of system 530 or from a memory of power controller 510, generates a power apply signal if the passwords are identical to each other, and generates a power shutoff signal if not. The power supply 550 starts operating when the power apply signal is received from the power controller 510, the power controller 510 being similar to the power controller 310 of FIGS. 3 and 4, and power controller 510 can also be a processor or microprocessor, for example. The power supply 550 is usually embedded in a system, such as a power conversion system to convert power to suitable power for the system. The power supply 550 of this embodiment is different from a conventional power supply in that it starts operating only when the power apply signal is received from the power controller 510, without applying the power to the overall system, such as to system 530, immediately after the power supply 550 is connected to an external power source.

Thus, in FIG. 5, in the system 530 according to the present invention, when a user turns on the startup switch 500, the power is applied only to the power controller 510 and the password input unit 520 from the auxiliary power supply 540. The password is input and the power supply 550 applies the power to the overall system 530 if the input password is identical to the preset password, and the power is shut off if the input and preset passwords are not identical, thereby prohibiting an unauthorized user from using the system, and also saving power.

Figure 6:
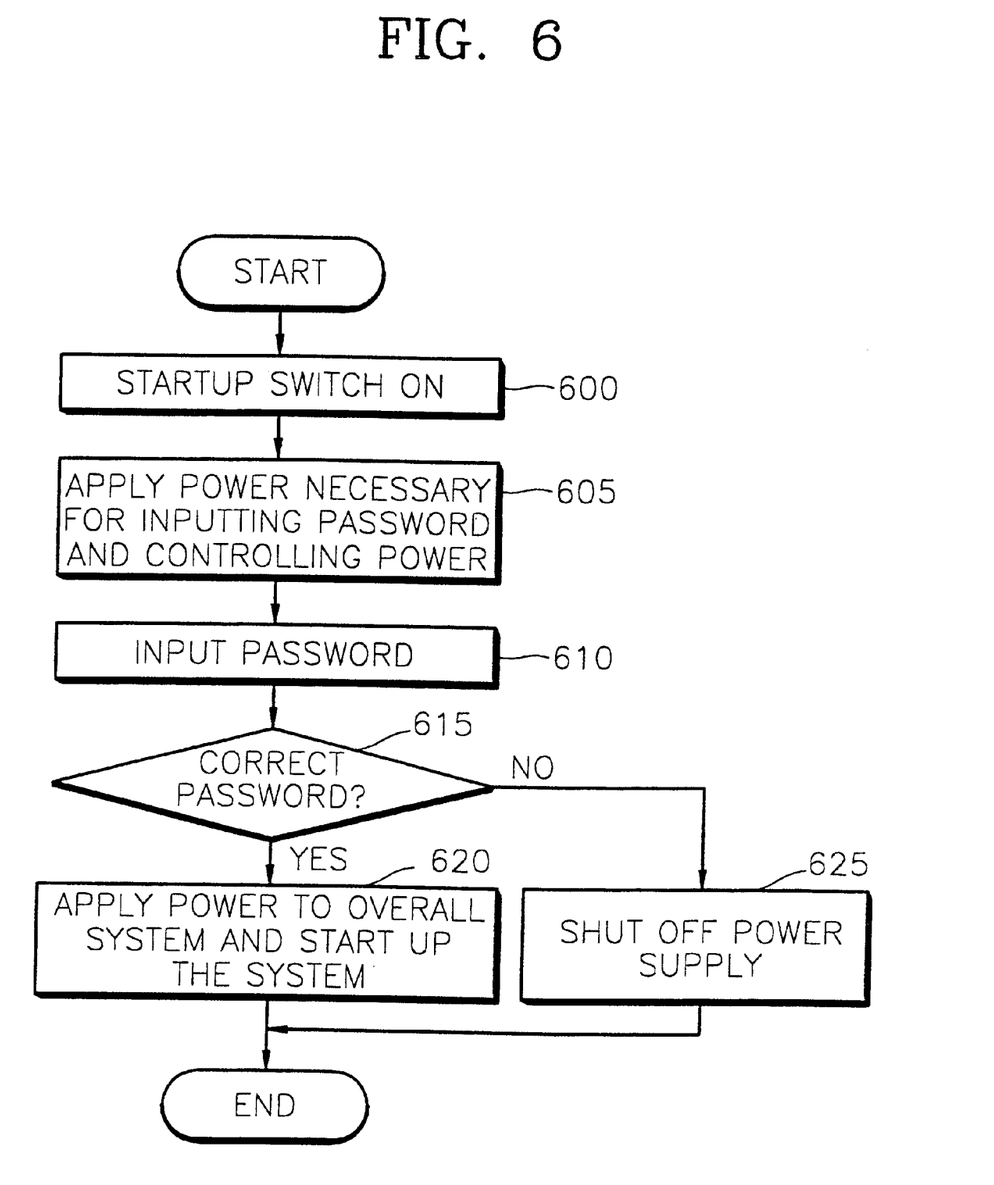
FIG. 6 is a flow chart illustrating a method for controlling power in starting up the system, such as a computer system, according to another embodiment of the present invention.

FIG. 6 is a flow chart illustrating a method for controlling power in starting up the system, such as a computer system, according to another embodiment of the present invention, such as can be implemented by the apparatus of FIG. 5, for example. As shown in FIG. 6, in the power controlling method according to this embodiment, when the startup switch is turned on (step 600), the power is applied only to components for inputting the password and executing a power control function (step 605), a password is input from a user through a password input unit, such as keyboard, for receiving the password (step 610), and it is determined whether the input password is identical to a predetermined password preset or previously stored in the system, such as from a memory of a computer system (step 615). Then, if the input and preset passwords are identical, the power is applied to the overall system (step 620). If the input and preset passwords are not identical, the power applied for inputting the password and controlling power is shut off (step 625).

Otherwise, in the above-described embodiments, when the input and preset passwords are not identical with each other, the power is not necessarily shut off immediately. Instead, a step of counting the number of times of trial for inputting incorrect passwords is performed. If the number of a trial is less than a predetermined number of times, the steps 210 and 215 of FIG. 2 or the steps 610 and 615 of FIG. 6 are repeated However, if the input and preset passwords are not identical and the number of a trial is equal to the predetermined number of times, the power is then shut off.

Further, the above-described power controlling method according to the present invention can be applied to a portable computer to save power, as well as to prevent unauthorized system use. The power controlling method in starting up the portable computer according to the present invention, as can be implemented by the apparatus of FIG. 5, for example, will now be described with reference to FIG. 7. First, when the startup switch of the portable computer is turned on (step 700), the power is applied to a power controller for executing a power control function and to a password input unit, such as a keyboard, for inputting a password (step 705). Next, it is determined whether or not external power is connected to the system (step 710). If external power is connected to the system, the power is applied to the other parts of the computer (step 715). Then, a password is received from a user (step 720). At this time, if the external power is not connected to the system, power is applied only to the power controller and the keyboard, and the password is input in a state such as where the screen of the computer is turned off, for example.

Figure 7:
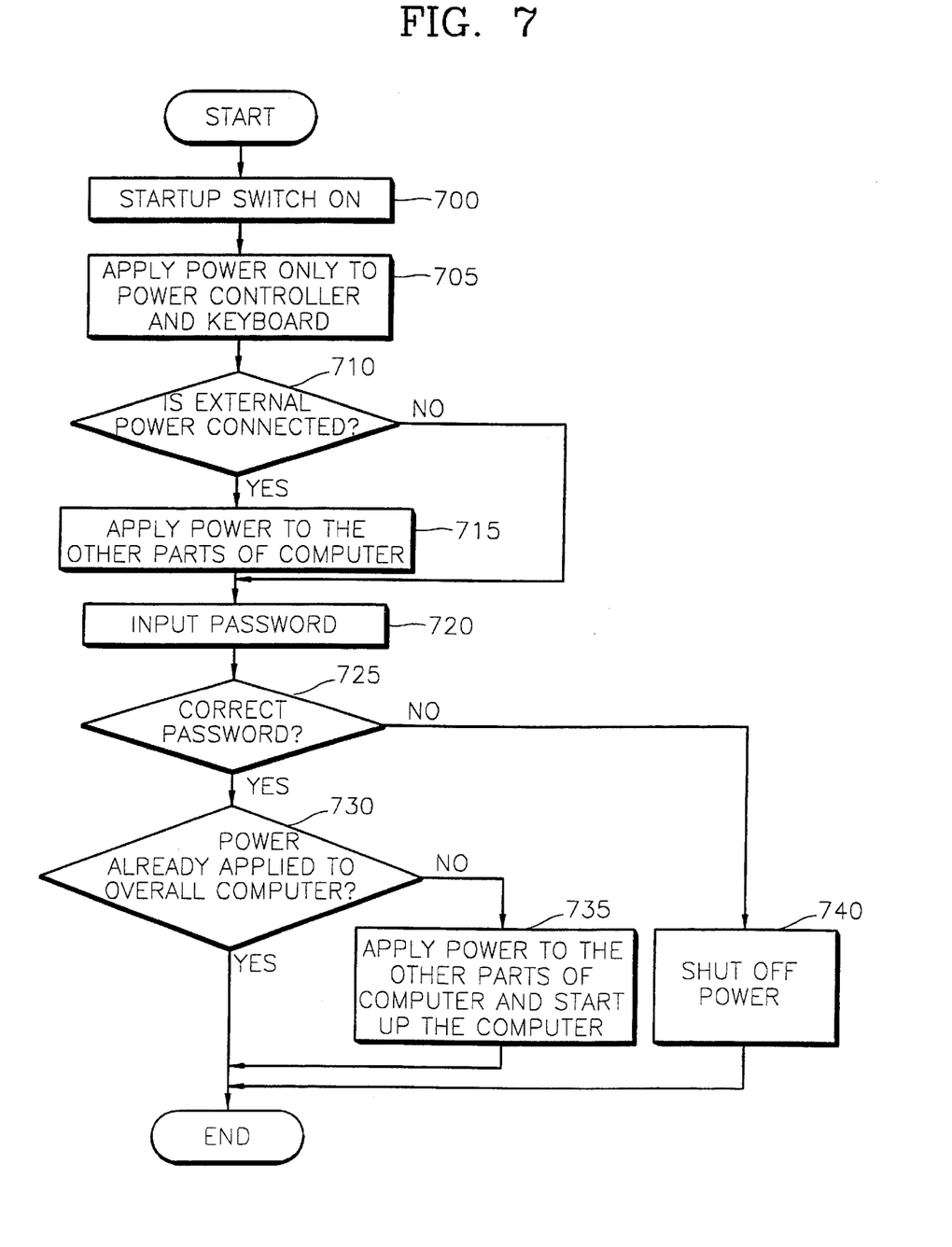
FIG. 7 is a flow chart illustrating a method for controlling power in starting up a portable computer according to the present invention.

Continuing with reference to FIG. 7, the input password then is compared to the preset password (step 725). As a result, if the two passwords are identical to each other, it is determined whether the power is applied to the overall portable computer, that is, whether the external power is connected to the system (step 730). If power has not been applied to the overall portable computer, the power is applied to other parts of the portable computer from a battery to start up the computer (step 735). In other words, if the external power is not connected, the power comes to be applied to the overall portable computer, such as including the screen, by the battery in this step (step 735). If the two passwords are not identical to each other, the already applied power is shut off (step 740).

In the power controlling method in starting up the portable computer according to the present invention, as in the above-described power controlling methods, the power is not necessarily shut off immediately even if the input and preset passwords are not identical to each other, but the steps 720 and 725 of FIG. 7 of inputting a password and comparing the passwords can be repeated a predetermined number of times. Also, even if the external power is connected, the power can be applied only to the power controller and the key board until the portable computer is started up according to the input of a correct password without performing the steps 710 and 715 of FIG. 7.

As described above, according to the present invention, the already applied power is automatically shut off if a password is not correct in starting up the system, such as a computer system. Otherwise, when starting up the system, the power is applied only to the components of the system, such as a computer system, for inputting a password and controlling power, and the power is applied to the overall system only when the password is correct, thereby prohibiting an unauthorized use of the system and preventing unnecessary power loss.

Particularly, in the case of a portable computer, when the external power is not connected but the computer operates only using a battery, the minimum power necessary for inputting the password and controlling the power is applied, thereby minimizing unnecessary reduction of available time of the battery by the unauthorized attempts to use the system.

While there have been illustrated and described what are considered to be preferred embodiments of the present invention, it will be understood by those skilled in the art that various changes and modifications may be made, and equivalents may be substituted for elements thereof, without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A system, comprising:
    a password input unit for receiving an input password from a user;
    a power controller for comparing the input password with a predetermined password, for outputting a power apply signal when the input password and the predetermined password are identical, and for outputting a power shutoff signal when the input password and the predetermined password are not identical;
    a power supply for applying power to the system when receiving the power apply signal from the power controller, and for shutting off power for the system when receiving the power shutoff signal from the power controller; and
    an auxiliary power supply for supplying power to the password input unit and to the power controller, wherein power for inputting a password to the password input unit and for controlling power by the power controller is supplied from the auxiliary power supply in a start up operation for the system.

2. The system according to claim 1, wherein the system comprises a computer system.

3. The method according to claim 1, wherein the system comprises a portable computer.

4. The system according to claim 1, wherein the power controller comprises a comparator for comparing the input password with the predetermined password, and a power control signal generator for receiving the output of the comparator, and for selectively generating the power apply signal and the power shutoff signal.

5. The system according to claim 1, wherein the auxiliary power supply receives the power shutoff signal from the power controller to shut off power supplied to the password input unit and to the power controller.

6. The system according to claim 5, wherein the system comprises a computer system.

7. The system according to claim 5, wherein the system comprises a portable computer.

8. The system according to claim 5, wherein the power controller comprises a comparator for comparing the input password with the predetermined password, and a power control signal generator for receiving the output of the comparator, and for selectively generating the power apply signal and the power shutoff signal.

9. A method for controlling power in a system, comprising the steps of:
    providing a power controller for controlling power for the system;
    providing a password input unit for inputting a password used for controlling power for the system;
    applying only auxiliary power for inputting a password to the password input unit and for controlling power by the power controller when a startup switch for the system is turned on;
    receiving, by means of the password input unit, an input password from a user;
    comparing, by means of the power controller, the input password with a predetermined password; and
    applying main power to all of the system when the power controller determines that the input password and the predetermined password are identical.

10. The method according to claim 9, further comprising the step of starting up the system when the input password and the predetermined password are identical.

11. The method according to claim 10, further comprising the step of shutting off power applied for inputting the input password and for controlling power for the system when the input password and the predetermined password are not identical.

12. The method according to claim 11, further comprising the step of generating selectively, by means of the power controller, a power apply signal to apply power to all of the system, and a power shutoff signal to shut off power for the system.

13. The method according to claim 11, wherein the step of shutting off power applied for inputting the input password and for controlling power for the system comprises the substeps of:
    counting a number of times of a trial for inputting an input password different from the predetermined password;
    comparing the input password with the predetermined password when the number of times of the trial is less than a predetermined number of times; and
    shutting off power applied for inputting an input password and for controlling power for the system when the number of times of the trial is equal to the predetermined number of times.

14. The method according to claim 13, further comprising the step of generating selectively, by means of the power controller, a power apply signal to apply power to all of the system, and a power shutoff signal to shut off power for the system.

15. The method according to claim 14, wherein the system comprises a computer system.

16. The method according to claim 14, wherein the system comprises a portable computer.

17. The method according to claim 9, further comprising the step of shutting off power applied for inputting the input password and for controlling power for the system when the input password and the predetermined password are not identical.

18. The method according to claim 17, further comprising the step of generating selectively, by means of the power controller, a power apply signal to apply power to all of the system and a power shutoff signal to shut off power for the system.

19. The method according to claim 17, wherein the step of shutting off power applied for inputting the input password and for controlling power for the system comprises the substeps of:

counting a number of times of a trial for inputting an input password different from the predetermined password;

comparing the input password with the predetermined password when the number of times of the trial is less than a predetermined number of times; and shutting off power applied for inputting an input password and for controlling power for the system when the number of times of the trial is equal to the predetermined number of times.

20. The method according to claim 19, further comprising the step of generating selectively, by means of the power controller, a power apply signal to apply power to all of the system, and a power shutoff signal to shut off power for the system.

21. The method according to claim 20, wherein the system comprises a computer system.

22. The method according to claim 20, wherein the power controller comprises a comparator for comparing the input password with the predetermined password, and a power control signal generator for receiving an output of the comparator, and for selectively generating the power apply signal and the power shutoff signal.

23. The method according to claim 9, wherein the system comprises a computer system.

24. The method according to claim 23, further comprising the step of generating selectively, by means of the power controller, a power apply signal to apply power to all of the system, and a power shutoff signal to shut off power for the system.

25. The method according to claim 24, wherein the power controller comprises a comparator for comparing the input password with the predetermined password, and a power control signal generator for receiving an output of the comparator, and for selectively generating the power apply signal and the power shutoff signal.

26. The method according to claim 9, further comprising the step of generating selectively, by means of the power controller, a power apply signal to apply power to all of the system, and a power shutoff signal to shut off power for the system.

27. The method according to claim 26, wherein the power controller comprises a comparator for comparing the input password with the predetermined password, and a power control signal generator for receiving an output of the comparator, and for selectively generating the power apply signal and the power shutoff signal.

28. A method for controlling power in a portable computer operated by at least one of a battery and external power, comprising the steps of:

providing a power controller for controlling power for the portable computer;

providing a password input unit for inputting a password used for controlling the power for the portable computer;

applying auxiliary power only for inputting an input password to the password input unit and for controlling power by the power controller when a startup switch for the portable computer is turned on by a user;

applying main power to all of the portable computer when the external power is being provided to the portable computer;

receiving, by means of the password input unit, an input password from the user;

comparing, by means of the power controller, the input password with a predetermined password;

determining whether the external power is being applied to all of the portable computer when the input password and the predetermined password are identical, and then executing a predetermined operation in a startup operation for the portable computer when the external power is being applied;

applying power from the battery to all of the portable computer in a startup operation for the portable computer when the input password and the predetermined password are identical, and when the external power is not being applied to the portable computer; and shutting off all power for the portable computer when the input password and the predetermined password are not identical.

29. The method according to claim 28, wherein the step of shutting off all power for the portable computer comprises the substeps of:

counting a number of times of a trial for inputting an input password different from the predetermined password;

comparing each input password with the predetermined password when the number of times of the trial is less than a predetermined number of times; and shutting off all power for the portable computer when the number of times of the trial is equal to the predetermined number of times.

30. The method according to claim 29, further comprising the step of generating selectively, by means of the power controller, a power apply signal to apply power to all of the portable computer, and a power shutoff signal to shut off power for the portable computer.

31. The method according to claim 30, wherein the power controller comprises a comparator for comparing the input password with the predetermined password, and a power control signal generator for receiving an output of the comparator, and for selectively generating the power apply signal and the power shutoff signal.

32. The method according to claim 28, further comprising the step of generating selectively, by means of the power controller, a power apply signal to apply power to all of the portable computer, and a power shutoff signal to shut off power for the portable computer.

33. The method according to claim 32, wherein the power controller comprises a comparator for comparing the input password with the predetermined password, and a power control signal generator for receiving an output of the comparator, and for selectively generating the power apply signal and the power shutoff signal.

* * * * *